(12) United States Patent
Achtel

(10) Patent No.: US 8,879,899 B1
(45) Date of Patent: Nov. 4, 2014

(54) SUBMERSIBLE STEREOSCOPIC BEAM SPLITTER SYSTEM

(71) Applicant: Pawel Achtel, Coles Bay (AU)

(72) Inventor: Pawel Achtel, Coles Bay (AU)

( * ) Notice: Subject to any disclaimer, the term of this patent is extended or adjusted under 35 U.S.C. 154(b) by 0 days.

(21) Appl. No.: 14/067,999

(22) Filed: Oct. 31, 2013

(51) Int. Cl.
  *G03B 17/08* (2006.01)
  *G03B 35/00* (2006.01)
  *G03B 35/08* (2006.01)

(52) U.S. Cl.
  CPC ........................... *G03B 35/08* (2013.01)
  USPC ............................................. 396/25; 396/325

(58) Field of Classification Search
  CPC ................................. G03B 17/08; G03B 35/08
  USPC ................................................ 396/25, 29, 325
  See application file for complete search history.

(56) References Cited

U.S. PATENT DOCUMENTS 3,162,106 A * 12/1964 De Wouters D'Oplinter .. 396/29
4,557,570 A * 12/1985 Hines ............................. 396/325

* cited by examiner

*Primary Examiner* — W B Perkey
(74) *Attorney, Agent, or Firm* — John Alumit

(57) ABSTRACT

A stereoscopic beam splitter having cameras with submersible lenses, such that the entire apparatus is filled with water when submerged. Submersible lenses designed to capture high-quality images underwater are utilized, allowing an underwater three-dimensional stereoscopic camera apparatuses to forgo a sealed housing with window port traditionally found in underwater stereoscopic beam splitter systems. The lack of a sealed housing and window port allows for drastically improved underwater image capturing performance and greater pressure caused by deeper water, in addition to making said apparatuses lighter and more compact.

2 Claims, 2 Drawing Sheets

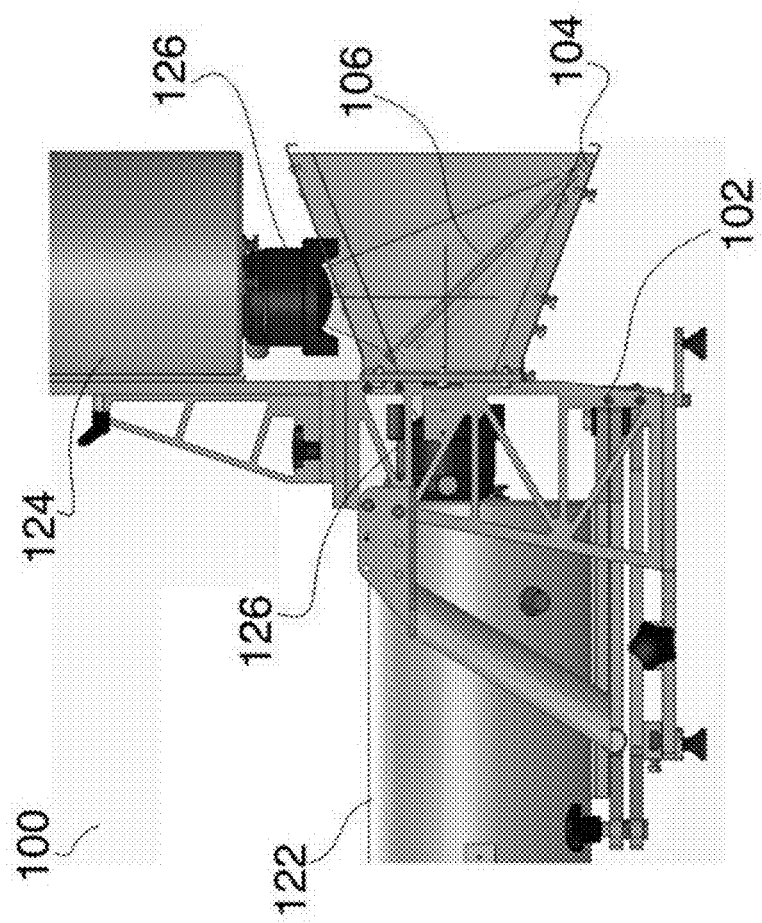

SUBMERSIBLE STEREOSCOPIC BEAM SPLITTER SYSTEM

CROSS-REFERENCE TO RELATED APPLICATION

Not Applicable

FEDERALLY SPONSORED RESEARCH

Not Applicable

SEQUENCE LISTING OR PROGRAM

Not Applicable

BACKGROUND

"Binocular vision" is sight in which both eyes are used together. Binocular viewing of a scene creates two slightly different images of the scene in the two eyes due to the eyes' different positions on the head. "Stereopsis" is the perception of depth that is achieved when someone with normal binocular vision views a scene with both eyes. However, stereopsis is not usually present when viewing a picture of a scene with both eyes.

"Stereoscopy is a technique for creating or enhancing the illusion of depth in an image (i.e. a picture) by means of stereopsis for binocular vision. The stereoscopy method utilizes two offset images separately to the left and right eye of the viewer where they are combined by the brain into a single multi-dimensional image. To make three-dimensional images or motion pictures, stereoscopic camera apparatuses are utilized that include a beam splitter and several cameras. The beam splitter is a device that splits a beam of incoming light, in two. Each split beam of light is captured as an image by a camera.

Three-dimensional beam splitters can be used on land and underwater. However, when used underwater, the stereoscopic camera apparatuses must be in a sealed housing. The sealed housing has a large flat window or port and contains the beam splitter, lenses and cameras. The addition of a flat window on the sealed housing creates optical aberrations, distortions and significantly degraded the optical quality of the captured images. Moreover, the sealed housing is a larger, more cumbersome, apparatus.

For the foregoing reasons, it would be desirable to have a stereoscopic camera apparatus with a beam splitter that can be used underwater without a sealed housing. The solution is found in the present disclosure for a submersible stereoscopic beam splitter, which comprises a fully submersible beam splitter and optics system with no sealed housing.

SUMMARY

The present disclosure is directed to a method that satisfies this need to have an underwater stereoscopic camera apparatus having no housing or window to cause degradation of the image quality. The apparatus and method comprises a beam splitter having a mirror box and half-mirror with a horizontal and vertical underwater camera attached.

To eliminate the sealed housing typically used in underwater three-dimensional stereoscopic camera apparatuses, water is allowed to flood the entire optics of the system. The optics of this system includes submersible lenses. The submersible lenses are designed to capture high-quality, sharp, images underwater. By eliminating the sealed housing and flooding the entire stereoscopic beam splitter and lenses, the underwater optical performance is improved. Further, the lack of a housing results in smaller and lighter equipment that is not limited by increased pressure as the system is used in deeper water.

DRAWINGS

FIG. 2 illustrates a side sectional view of the stereoscopic camera apparatus of FIG. 1 embodying features of the present invention for a submersible stereoscopic beam splitter system.

DESCRIPTION

Figure 1:
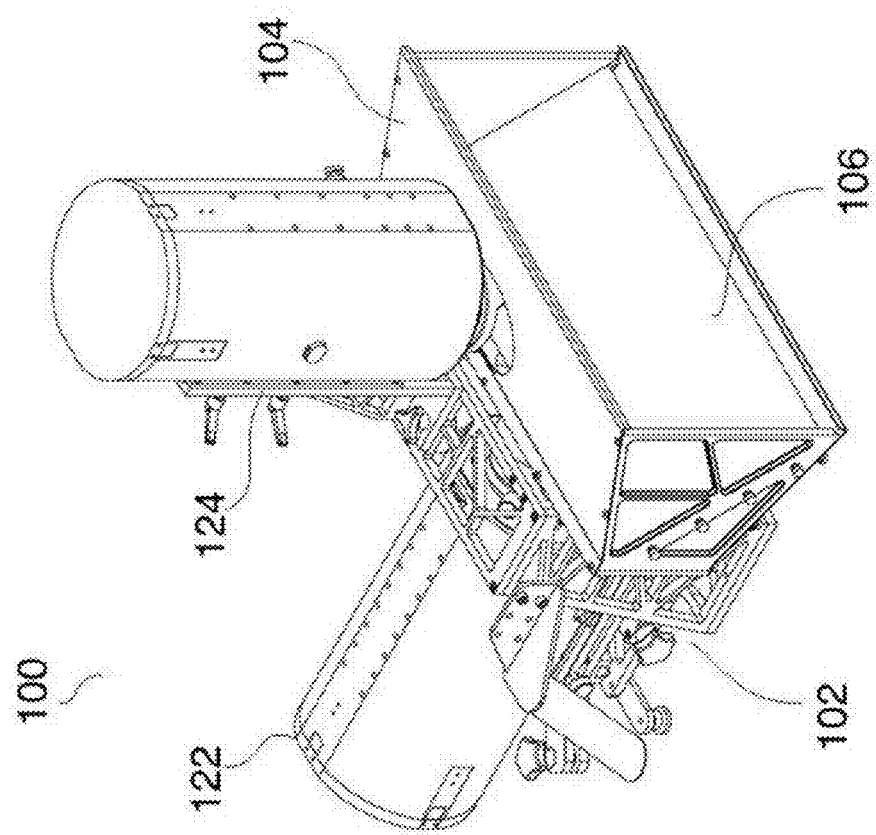
FIG. 1 illustrates a front perspective view of a stereoscopic camera apparatus embodying features of the present invention for a submersible stereoscopic beam splitter system.

As shown in FIGS. 1-2, a submersible stereoscopic beam splitter system 100 may comprise a stereoscopic camera apparatus 102 having a horizontal camera 122 and a vertical camera 124, mounted on a plane that is perpendicular to the horizontal camera 122. The submersible stereoscopic beam splitter system 100 does not use a sealed housing, instead allowing the entire optics system to be submerged in water, reducing overall size and depth restrictions from traditional underwater stereoscopic beam splitter systems.

Referring to FIG. 2, A beam splitting mirror 106 causes an incoming beam of light, i.e. the image to be captured, to be split into two separate beams. The beam splitting mirror 106 is affixed within a mirror box 104. The mirror box 104 may be located on a stereoscopic camera apparatus 102 at the intersecting plane of a perpendicular mounted horizontal camera 122 and vertical camera 124. The submersible stereoscopic beam splitter system 100 of the present disclosure utilizes submersible lenses 126 affixed to the horizontal camera 122 and vertical camera 124. The submersible lenses 126 are specifically designed to take sharp photos while being submerged in water or a similar liquid.

To create the stereoscopic beam splitter system 100, submersible lenses 126 are affixed to underwater cameras. The cameras are attached to a stereoscopic camera apparatus 102 so that the axial plane of each camera crosses at the mirror box 104 having a beam splitting mirror 106. The stereoscopic camera apparatus 102, mirror box 104 and beam splitting mirror 106 incorporate non-corrosive hardware like that typically used in fresh or saltwater atmospheres.

All features disclosed in this specification, including any accompanying claim, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, paragraph 6. In particular, the use of "step of" in the claims herein is not intended to invoke the provisions of 35 U.S.C. §112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed:

1. A method for submerging a stereoscopic beam splitter system in water, without a sealed housing, comprising the steps of:
   (a) mounting a stereoscopic camera apparatus with a horizontal underwater camera and a vertical underwater camera onto a plane that is perpendicular to the horizontal underwater camera;
   (b) affixing a submersible beam splitting mirror within a submersible mirror box; the mirror box having no front glass panel or port;
   (c) attaching the mirror box on the stereoscope camera apparatus at the intersecting plane of the horizontal underwater camera and vertical underwater camera;
   (d) Affixing submersible lenses to the underwater cameras;
   (e) Positioning the horizontal underwater camera and vertical underwater camera so that the axial plane of each camera crosses at the mirror box with the beam splitting mirror; and
   (f) Submerging the stereoscopic beam splitter system into water without a housing, for underwater picture taking.

2. The method of claim 1, wherein two cameras are affixed to a stereoscopic camera apparatus such that an intersecting plane of each submersible camera lens intersects at the beam splitting mirror.

* * * * *